United States Patent [19]

Vasic

[11] Patent Number: 5,809,089
[45] Date of Patent: Sep. 15, 1998

[54] RECEIVING UNIT, SOFT INFORMATION DATA PROCESSOR AND DECODING METHOD THEREOF USED FOR A CODE DIVISION MULTIPLE ACCESS SYSTEM

[75] Inventor: Dobrica Vasic, Tokyo, Japan

[73] Assignee: NEC Corporation, Tokyo, Japan

[21] Appl. No.: 605,749

[22] Filed: Feb. 22, 1996

[30] Foreign Application Priority Data

Feb. 22, 1995 [JP] Japan .................................. 7-033211

[51] Int. Cl.⁶ ................................................. H03M 13/12
[52] U.S. Cl. ...................... 375/341; 375/347; 375/349; 371/43.7; 371/43.8; 370/342; 370/479
[58] Field of Search .................... 375/200, 205, 375/206, 208, 262, 340, 341, 346–349; 370/203, 208, 320, 335, 342, 441, 379; 371/37.1, 37.8, 37.9, 43, 43.6–43.8; 380/28, 33, 34

[56] References Cited

U.S. PATENT DOCUMENTS 5,103,459   4/1992   Gilhousen et al. .
5,109,390   4/1992   Gilhousen et al. .
5,442,629   8/1995   Viterbi et al. ........................... 370/208
5,450,453   9/1995   Frank ..................................... 375/200

*Primary Examiner*—Don N. Vo
*Assistant Examiner*—Amanda T. Le
*Attorney, Agent, or Firm*—Ostrolenk, Faber, Gerb & Soffen, LLP

[57] ABSTRACT

The present invention comprises: M units of Bessel function calculation means for inputting M signals $X_1$ to $X_M$ that are produced by performing a reception signal high-speed Hadamard's transformation and outputting M modified Bessel functions $Y_1$ to $Y_M$ corresponding to the signals; and K units of bit metric calculation means having addition means for adding the modified Bessel functions $Y_1$ to $Y_M$ to each bit of k bits according to codes that are determined for cases of assumption that 0 is transmitted and 1 is transmitted and logarithm calculation means for calculating logarithm of output from the addition means for obtaining soft information.

20 Claims, 5 Drawing Sheets

FIG.4

| WALSH FUNCTION INDEX n | CODED BITS | | | | | DIVERSITY COMBINER OUTPUT Xn | BESSEL FUNCTION VALUE Yn |
|---|---|---|---|---|---|---|---|
| | Bkn | ... | Bin | B2n | B1n | | |
| 1 | 0 | | 0 | 0 | 0 | X1 | Y1 |
| 2 | 0 | | 0 | 1 | 1 | X2 | Y2 |
| 3 | 0 | | 0 | 1 | 0 | X3 | Y3 |
| 4 | 0 | | 0 | 1 | 1 | X4 | Y4 |
| ... | ... | | ... | ... | ... | | |
| M-1 | 1 | | 1 | 1 | 0 | XM-1 | YM-1 |
| M | 1 | | 1 | 1 | 1 | XM | YM |

*M=64 and K=6 for IS95 system

RECEIVING UNIT, SOFT INFORMATION DATA PROCESSOR AND DECODING METHOD THEREOF USED FOR A CODE DIVISION MULTIPLE ACCESS SYSTEM

BACKGROUND OF THE INVENTION

The present invention relates to cellular telephone systems. More specifically, the present invention relates to improving a receiver design for enhancing the reliability and communications in the cellular telephone environment. The proposed method can be used in a Code Division Multiple Access (referred to as CDMA, hereinafter) cellular system with M-ary orthogonal signaling and noncoherent detection such as Qualcomm's CDMA system (IS95-North American Digital Cellular).

CDMA is a modulation and multiple access technique based on spread spectrum communication that has been applied to digital cellular radio communications and wireless technologies, like Qualcomm's CDMA system (IS95 system). CDMA is one of several techniques for facilitating communication in which a large number of system users are present. In the CDMA system all the users employ the same code for the encoding and decoding of their respective information sequences, the transmitted signals in the common spectrum are distinguished from one another by superimposing a different pseudo-random pattern, also called a code, on each transmitted signal. Thus a particular receiver can recover the transmitted information intended for it by knowing the pseudo-random pattern, i.e., the key, used by the corresponding transmitter.

The cellular mobile channel typically has Rayleigh fading characteristic. The Rayleigh fading channel is caused by the reflection of signals from many different features of the physical environment, and results in copies of the signal arriving simultaneously from many directions with different transmission delays. This causes significant phase differences between the paths with the possibility for destructive summation, resulting in deep fades. Fading is very disruptive to the channel, which results in poor communications. CDMA provides inherent discrimination of multiple received multipath components and constructive recombination of these components.

Diversity techniques are very effective in overcoming the effects of fading caused by time-variant dispersive characteristics of a channel. The additional benefits can be provide by efficient codes. In CDMA the powerful redundancy error correction code can be used. Coding provides an efficient means of obtaining diversity on fading channel. The amount of diversity provided by a code is directly related to its minimum distance. IS95 system uses convolutional encoding and optimum decoding which, for this type of code, uses soft decision Viterbi algorithm.

On the forward (cell-to-mobile) link the Pilot channel signal is shared among all the users and used as a coherent reference for demodulation by all mobile terminal receivers. This is not possible on the reverse link (mobile-to-cell), since overall system capacity would be greatly reduced by the presence of a large number of pilot signals. Reverse channels are corrupted by Rayleigh fading, resulting in rapidly varying channel phase, so for coherent demodulation, efficient carrier synchronization technique which derives phase from receive signal should be used. Other techniques such as differentially coherent demodulation can also be used. However, these techniques can fail to provide the desired level of performance in phase tracking under fast fading conditions.

The second approach is to employ orthogonal M-ary signaling and noncoherent detection. The demodulator for M-ary orthogonal signaling requires channel coherence only over the duration of transmission of the M-ary symbol. In the IS95 system the 64-ary orthogonal signaling techniques is employed using Walsh functions.

On the Reverse link of the IS95 system the transmitted digital information is convolutionally encoded using a rate 1/3 and a constraint length of 9. The encoded information is then interleaved over a 20 ms interval. The encoded information is then grouped into 6 symbol group. The 6 bits in a group are used to select one of M=64 different orthogonal Walsh functions for transmission. The Walsh function chips are combined with the long and short PN codes. The Walsh function for the Reverse link is determined by the information being transmitted.

A Reverse link channel for the IS95 system consists of a signal centered on an assigned radio frequency, offset quadriphase modulated by a pair of PN codes, biphase modulated by a long PN code, and biphase modulated by the Walsh encoded, interleaved, and convolutionally encoded digital information signal.

In the cellular telephone system fading deleteriously effects communications. It is, therefore, an object of the present invention to provide a novel and improved method to make the usage of soft information data for Viterbi decoding in a CDMA cellular system with M-ary orthogonal signaling and noncoherent detection more efficient, improving, in that way, receiver performance.

In the IS95 system convolutional encoding and optimum soft decision Viterbi decoding are used. In the conventional methods such as U.S. Pat. Nos. 5,109,390 and 5,103,459 the resulting 64 coefficients from the diversity combiner are compared with one another in order to determined the largest coefficient. The magnitude of the comparison result, together with the identity of the largest of 64 coefficients, is used as soft information data for Viterbi decoder. Soft information data in this method based on magnitude of comparison between the largest and the second largest coefficient and the identity of the largest coefficient.

Based on set of 64 coefficients from diversity combiner, a set of decoder weights or metrics for Viterbi decoder should be determined. The calculated metrics should contain the maximum available information to recover the information data with high reliability. In the present invention a novel and improved method to generate soft information data is proposed. Using all the coefficients from the diversity combiner for calculation of the decoder weights, the quality of soft information data can be improved.

The set of 64 coefficients X1 to X64 from diversity combiner is used as input to the generator of soft information data for the Viterbi decoder. For each input $X_n$, where n=1, . . . ,64, the quantized value $Y_n$ ($X_n$) =$I_o$ ($X_n$) is selected from look-up table, where $I_o$ (X) is zero order modified Bessel function of the first kind. Zero order modified Bessel function is used for single path receiver. When L paths diversity combined, then L−1 order modified Bessel function should be used.

For each coded bit $B_i$, i=1, . . . 6 two bit metrics $MB_i(x/0)$ and $MB_i(x/1)$ are calculated. The bit metric $MB_i(x/0)$ is the transition metric used in the Viterbi decoder when bit $B_i$=0 is transmitted and set X1 to X64 received. The bit metric $MB_i(x/1)$ is the transition metric used when bit $B_i$=1 is transmitted and set X1 to X64 is received.

In order to calculate two bit metrics $MB_i(x/0)$ and $MB_i(x/1)$, it is necessary to calculate two sums. The first sum for SBi(x/0) is calculated by summing all values Yn for which the bit Bi has value 0. The calculation of the second sum for SBi(x/1) is performed by summing all the values Yn for which the bit Bi has value 1. Only those coefficients from the diversity combiner for which Bi=0 contribute to the first sum. Only those coefficients from diversity combiner for which Bi=1 contribute to the second sum. The bit metrics MBi(x/0) and MBi(x/1) for the bit Bi are calculated by taking logarithm of the first and the second sum respectively.

For the calculation of each pair of bit metrics MBi(x/0) and MBi(x/1) all coefficient are used, improving in that way quality of soft information, which results in an improvement in Viterbi decoder performance. The increase in th complexity can be reduced by using ROM look-up tables for the calculation of modified Bessel functions and by sharing the computation between the bits.

SUMMARY OF THE INVENTION

It is an object of the present invention to provide a receiving unit, a soft information data processor and a decoding method thereof used for a code division multiple access system.

The object of the present invention is achieved by a receiving unit comprising:

Bessel function calculation means for calculating M modified Bessel functions of the first kind respectively corresponding to M data obtained by noncoherently detecting an M-ary orthogonal spread spectrum signal;

bit metrics calculation means for calculating K ($\log_2 M$) pairs of bit metrics based on the M modified Bessel functions of the first kind;

decoding means for soft decision Viterbi decoding based on the K pairs of bit metrics.

The implementation of CDMA techniques in the mobile cellular telephone environment provides features to enhance system reliability and capacity. Due to the wide channel bandwidth employed in the CDMA system, it is possible to use extremely powerful and high redundancy error correction techniques. CDMA uses convolutional encoding and optimum soft decision Viterbi decoding to implement error correction.

In the present invention a novel and improved method to generate soft information data for Viterbi decoding is proposed. The proposed method can be used in a CDMA cellular system with M-ary orthogonal signaling and non-coherent detection. The proposed method uses all outputs of the optimum demodulator to generate soft information, which results in an improvement in the Viterbi decoder performance.

BRIEF DESCRIPTION OF THE DRAWINGS

This and other objects, features and advantages of the present invention will become more apparent upon a reading of the following detailed description and drawings, in which:

FIG. 4 illustrates the mapping coded bits to orthogonal Walsh functions on the transmitter side.

DESCRIPTION OF THE PREFERRED EMBODIMENTS

When the CDMA system employs M-ary orthogonal signaling and noncoherent detection, the optimum demodulator computes M decision variables and selects the signal corresponding to the largest decision variable. We say that the demodulator has made a hard decision on each bit. When the decoder operates on hard decisions made by the demodulator the decoding process is called hard decision decoding. When the decoder uses additional information, contained in the M decision variables, to recover the information sequence, with higher reliability than that achieved with hard decision, we refer to this king of decoding as soft-decision decoding. The main subject in the present invention is how to use additional information contained in the outputs of optimum demodulator for soft decision decoding, in order to improved performance achieved by coding. In CDMA diversity combing techniques are widespread. When diversity combining is used, the outputs of optimum receivers are combined before Viterbi decoding. The IS95 system employs M-ary orthogonal signaling using the set of Walsh function sequences. The optimum demodulation for this kind of orthogonal signaling is based on the use of the Fast Hadamard Transform (FHT) in the receiver.

Figure 1:
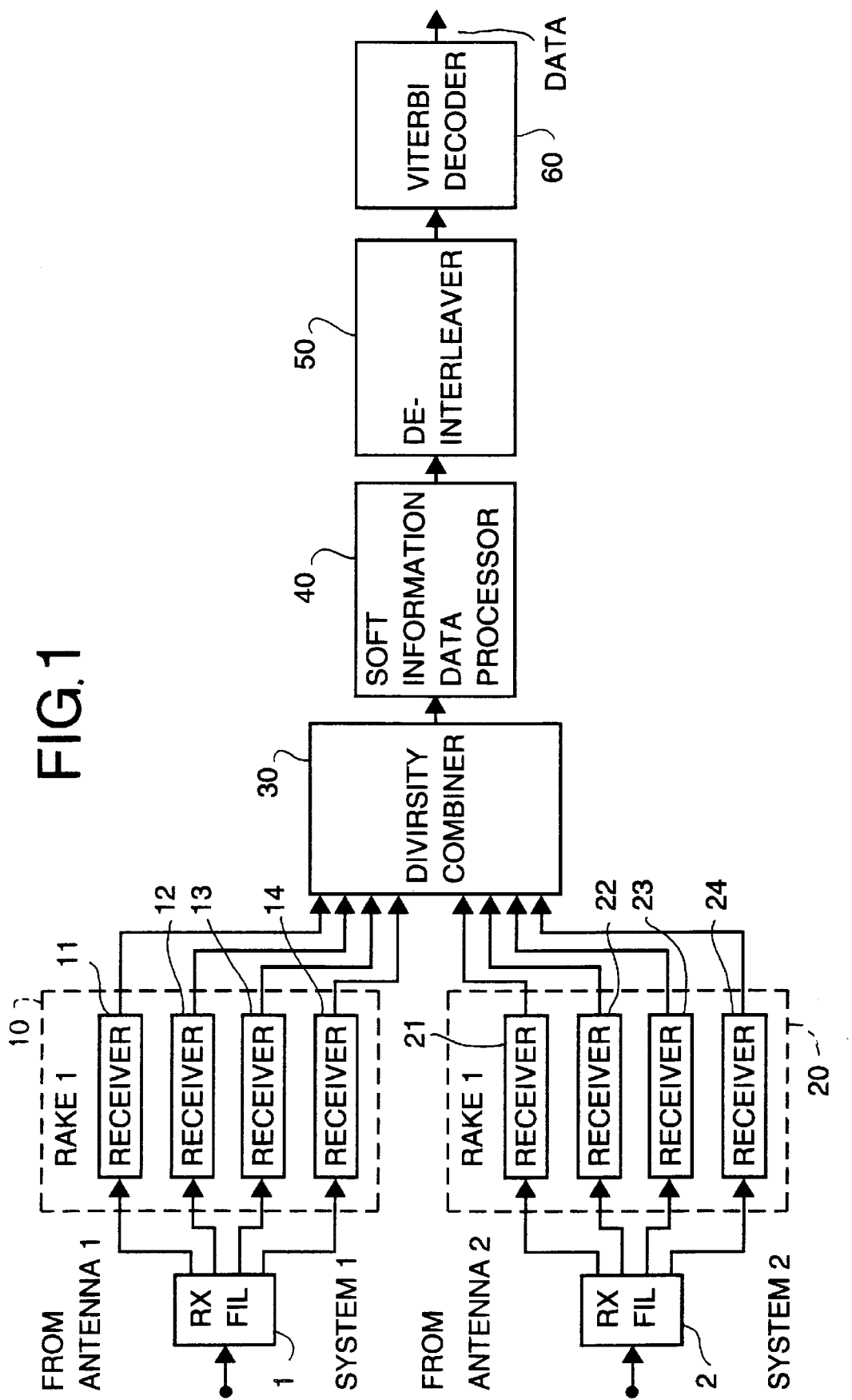
FIG. 1 is a general block diagram of the CDMA receiver which employ noncoherent detection of M-ary orthogonal signals and soft decision Viterbi decoding.

Before we go into a detailed description of the proposed method for the generation of soft information data, we will briefly describe, refer to FIG. 1, the position and purpose of the block that generates the soft information data in the CDMA receiver.

FIG. 1 illustrates a general block diagram of the CDMA receiver which employs diversity combining, noncoherent detection of M-ary orthogonal signals and soft decision Viterbi decoding. FIG. 1 presents the main based band processing. The processing at RF and IF frequencies, down conversion and timing recovery as well as some other functions are not illustrated. In FIG. 1, diversity reception is employed with two separate antennas and two independent receive systems. Numerals 1 and 2 are receiver filters. Each receive system uses a RAKE receiver allowing signals arriving with different propagation delays to be received separately and combined, rake 10 and rake 20 in the FIG. 1. Each RAKE receiver combine up to four path receivers (up to four fingers). The each path receiver (a RAKE fingers 11–14 and 21–24) implements despreading and Fast Hadamard Transform (FHT) processing. The FHT processor in each path receiver calculates a set of 64 coefficients for every 6 coded bits. The data outputted from the FHT processors is provided to a diversity combiner 30. The diversity combiner 30 adds the 64 weighted coefficients from active path receivers, forming the new set of output coefficients X1 to X64. The weighting function for each path receiver is linked to the demodulated signal strength.

The output of the diversity combiner is used as input data to the soft information data processor 40. For the each set of 64 input coefficients the soft information data processor 40 computes 6 pairs of output data or 6 pairs of bit metrics used for Viterbi decoding in circuitry 60. Before Viterbi decoding, deinterleaving should be done, by circuitry 50. In the deinterleaver 50 the pairs of bit metrics (pairs of weights) are deinterleaved over 20 ms interval. the Viterbi decoder is utilized to determine the most likely information bit sequence.

Figure 2:
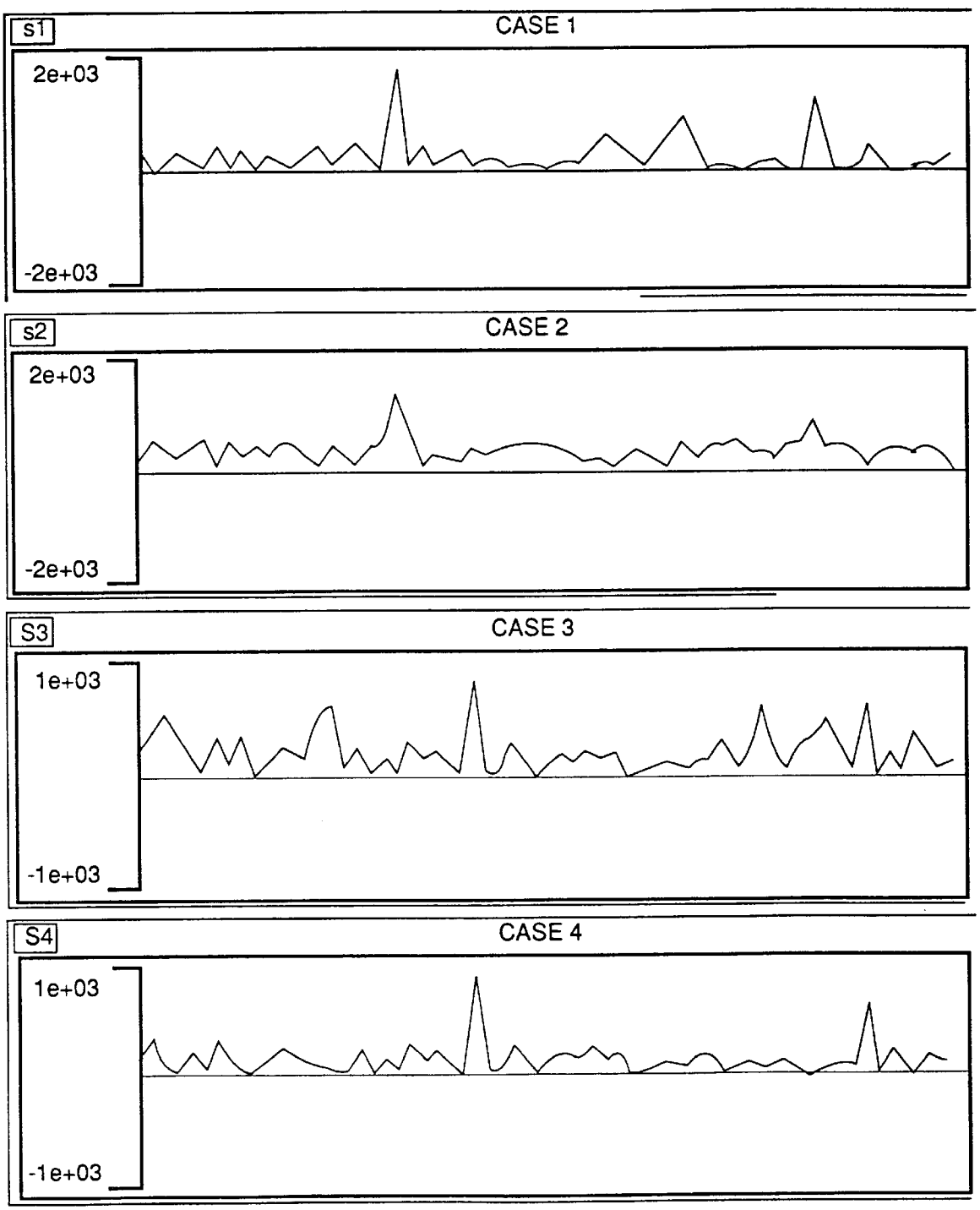
FIG. 2 illustrates some possible outputs of the diversity combiner. The diversity combiner output is used to generate soft information data.

FIG. 2 illustrates four possible outputs of the diversity combiner. For each case, the set of 64 output coefficients is illustrated. Although, the difference between the largest and the second largest coefficients for cases 1 and 2 in FIG. 2 are the same, the soft information contained in these two sets are not the same. Case 3 and 4 in FIG. 2 have the same largest and the same second largest coefficients, but these two cases, also contain different soft information. Based on the set of 64 coefficients from the diversity combiner, we need to determine a set of decoder weights or metrics for Viterbi decoding. The calculated metrics should contain the maximum available information to recover the information data with high reliability. Using all the coefficients from the diversity combiner for the calculation of the decoder weights, the quality of soft information data can be improved.

Figure 3:
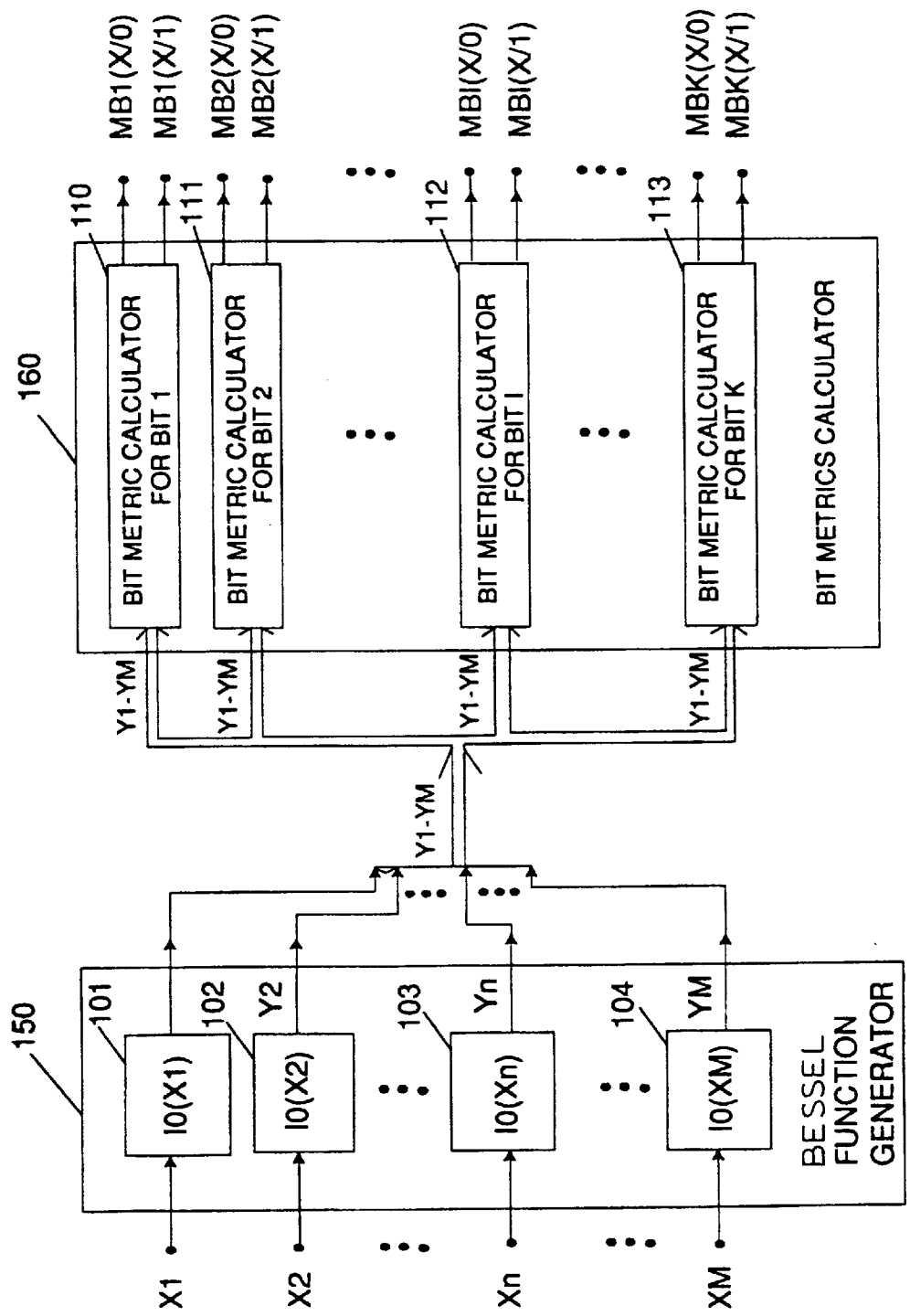
FIG. 3 is an exemplary block diagram for soft information data processor. The soft information data processor has two main parts; Bessel function calculator and bit metrics calculator. For each coded bit two bit metrics are calculated. These bit metrics used as soft information data for Viterbi decoding.

FIG. 3 illustrates the calculation of bit metrics for the Viterbi decoding. This figure is detailed illustration of soft information data processor 40 in the FIG. 1. The soft information data processor has two main parts; Bessel function calculator 150 and bit metrics calculator 160. The set of decision variables X1 to XM from the diversity combiner is used as input. In the case of a single path receiver, the outputs of a single optimum demodulator are used as inputs. In the single path receiver case, for each input Xn n=1, 2, . . . , M the quantized value Yn(Xn)=Io(Xn) is selected from the table, where Io(x) is a zero order modified Bessel function of the first kind. These look-up table operations are illustrated by blocks 101, 102, 103 and 104. In the diversity combining case, when L channels are combined, the selected quantized value Yn(Xn) is defined by the following formula;

$$Yn(Xn) = Xn^{-(L-1)/2} I_{L-1}(b*Xn)$$

where, b is a constant parameter.

In the previous formula $I_{L-1}(X)$ is an L-1 order modified Bessel function of the first kind. All further processing for the single path receiver case and diversity combing case are the same.

For each coded bit Bi, i=1, . . . , K two bit metrics MBi(x/0) and MBi(x/1) are calculated. These processing are illustrated by bit metric calculators 110. 111, 112 and 113 in FIG. 3. The bit metric MBi(x/0) is the transition metric used in the Viterbi decoder when bit Bi=o is transmitted and set X1 to XM received. The bit metric MBi(x/1) is the transition metric used when bit Bi=1 is transmitted and set X1 to XM is received.

FIG. 4 illustrates mapping of the coded bits to the orthogonal Walsh function of the transmitter side. For the IS95 system K=6 coded bits are used to select one of M=64 orthogonal Walsh functions. The Walsh function is selected by the modulation Walsh function index, which is define by following formula;

$$index = B1 + 2B2 + \ldots + 2^{K-1} * BK$$

Each coefficient from the FHT corresponds to one of the M orthogonal signal waveforms, each quantized value Yn(Xn) from FIG. 3 also corresponding to one of the M orthogonal waveforms, as illustrated in FIG. 4.

Figure 5:
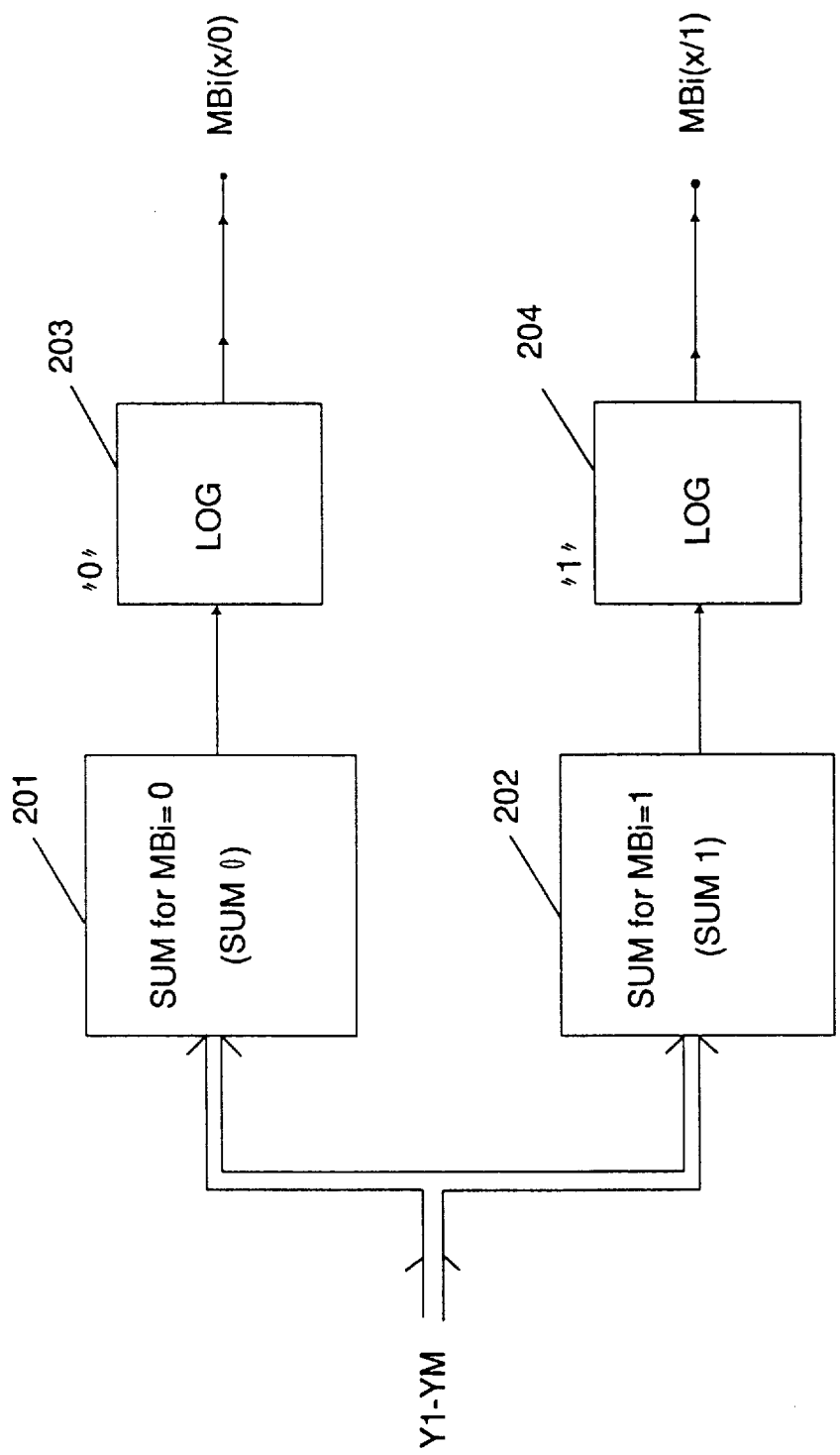
FIG. 5 illustrates detailed processing for one coded bit, where sum and logarithm operation are performed.

The detailed processing for bit Bi, the bit metric calculator 112 in FIG. 3, is illustrated by FIG. 5. For each coded bit Bi, in order to calculated two bit metrics MBi(x/0) and MBi(x/1), it is necessary to calculate two sums. The calculation of these two sums are illustrated by blocks 201 and 202 in FIG. 5. Using the notation from FIG. 4, these two sums can be calculated by using the follows equations;

$$SBi(x/0) = \sum_{n=1}^{M} (1 - Bin) * Yn \text{ (block 201, FIG. 5)}$$

$$SBi(x/1) = \sum_{n=1}^{M} Bin * Yn \text{ (block 202, FIG. 5)}$$

where;
i=1, 2, . . . , K;
n=index+1;
Bin is value of bit Bi for Walsh function index n.

The first sum SBi(x/0) is calculated by summing all values YN for which the bit Bi has value 0. The calculation of the second sum SBi(x/1) is performed by summing all the values Yn for which the bit Bi has value 1. Only those coefficients from the diversity combiner for which Bi=0 contribute to the first sum. Only those coefficients from diversity combiner for which Bi=1 contribute to the second sum.

The bit metrics MBi(x/0) and MBi(x/1) for bit Bi are calculated by taking the logarithms of the first and the second sum respectively, which can be expressed as;

$$MBi(x/0) = \log[SBi(x/0)]$$
$$MBi(x/1) = \log[SBi(x/1)]$$

The logarithm operation are illustrated by blocks 203 and 204 in the FIG. 5. These bit metrics are used as soft information data in Viterbi decoding. Intermediate results of calculation of sums SB(i-1),(x/0) and SB(i-1)(x/1) for the bit Bi-1, can be used to speed-up the computation of bit metrics for bit Bi. By sharing the computation between the bits the the reduction in the computation can be done.

In the proposed method all outputs of the optimum demodulator are used to generate the soft information data, improving the quality of soft information, which results in an improvement in the Viterbi decoder performance.

What is claimed is:

1. A receiving unit comprising:
    Bessel function calculation means for calculating M modified Bessel functions of the first kind, where M is an integer, respectively corresponding to M data obtained by noncoherently detecting an M-ary orthogonal spread spectrum signal;
    bit metrics calculation means for calculating K pairs of bit metrics, where K is $\log_2 M$, based on said M modified Bessel functions of the first kind;
    decoding means for soft decision Viterbi decoding based on said K pairs of bit metrics.

2. The receiving unit of claim 1, wherein said Bessel function calculation means calculates an L-1 order modified Bessel function of the first kind, where L is an integer, when said M data have been formed through combining M data of L paths obtained by noncoherently detecting an M-ary orthogonal spread spectrum signal.

3. The receiving unit of claim 1, wherein said Bessel function calculation means comprises storing means in which modified Bessel functions of the first kind are stored and reads a modified Bessel function of the first kind corresponding to an input data from said storing means.

4. The receiving unit of claim 1, wherein said bit metrics calculation means comprises means for calculating K pairs of bit metrics by pairing a logarithm of sum of said M modified Bessel functions of the first kind when bit data is 0 and a logarithm of sum of said M modified Bessel functions of the first kind when bit data is 1 for each bit of K bit coded data.

5. The receiving unit of claim 4, wherein said bit metrics calculation means comprising:
k units of calculation means for calculating bit metrics for each bit of coded data, wherein each said calculation means comprises:
means for calculating sum of said M modified Bessel functions of the first kind when bit data is 0;
means for calculating logarithm of said sum when bit data is 0;
means for calculating sum of said M modified Bessel functions of the first kind when bit data is 1;
means for calculating logarithm of said sum when bit data is 1.

6. The receiving unit of claim 4, wherein said bit metrics calculation means comprises means for calculating a bit metric using a calculated value obtained in calculation of other bit metrics of said coded data when calculating said bit metric of a predetermined bit of said coded data.

7. A receiving unit used for Code Division Multiple Access system, comprising:
means for generating M data, where M is an integer, by combining M data of L paths, where L is an integer, obtained by noncoherently detecting an M-ary orthogonal spread spectrum signal;
Bessel function calculation means for storing modified Bessel functions of the first kind and calculating M modified Bessel functions of the first kind through reading out a modified Bessel function of the first kind corresponding to each of said generated M data;
bit metrics calculation means for calculating K pairs of bit metrics, where K is an integer, by pairing a logarithm of sum of said M modified Bessel functions of the first kind when bit data is 0 and a logarithm of sum of said M modified Bessel functions of the first kind when bit data is 1 for each bit of K bit coded data; and
decoding means for soft decision Viterbi decoding based on said K pairs of bit metrics.

8. The receiving unit of claim 7, wherein said bit metrics calculation means comprising:
K units of calculation means for calculating bit metrics for each bit of coded data, wherein each said calculation means comprises:
means for calculating sum of said M modified Bessel functions of the first kind when bit data is 0;
means for calculating logarithm of said sum when bit data is 0;
means for calculating sum of said M modified Bessel functions of the first kind when bit data is 1;
means for calculating logarithm of said sum when bit data is 1.

9. The receiving unit of claim 7, wherein said bit metrics calculation means comprises means for calculating a bit metric using a calculated value obtained in calculation of other bit metrics of said coded data when calculating said bit metric of a predetermined bit of said coded data.

10. A decoding method in a Code Division Multiple Access system, comprising steps of:
calculating M modified Bessel functions of the first kind, where M is an integer, respectively corresponding to M data obtained by noncoherently detecting an M-ary orthogonal spread spectrum signal;
calculating K pairs of bit metrics, where K is $\log_2 M$, based on said M modified Bessel functions of the first kind; and
soft decision Viterbi decoding based on said K pairs of bit metrics.

11. The decoding method in a Code Division Multiple Access system of claim 10, wherein said step of calculating Bessel functions calculates an L−1 order modified Bessel function of the first kind, where L is an integer, when said M data have been formed through combining M data of L paths obtained by noncoherently detecting an M-ary orthogonal spread spectrum signal.

12. The decoding method in a Code Division Multiple Access system of claim 10, wherein said step of calculating Bessel functions stores modified Bessel functions of the first kind and selects a modified Bessel function of the first kind corresponding to an input data from said stored modified Bessel functions of the first kind.

13. The decoding method in a Code Division Multiple Access system of claim 10, wherein said step of calculating bit metrics comprising steps of:
calculating a sum of said M modified Bessel functions of the first kind when bit data is 0 and a sum of said M modified Bessel functions of the first kind when bit data is 1 for each bit of K bit coded data;
calculating a logarithm of said sum when bit data is 0 and a logarithm of said sum when bit data is 1 for each bit of K bit coded data; and
pairing said logarithm when bit data is 0 and said logarithm when bit data is 1 for each bit of K bit coded data.

14. The decoding method in a Code Division Multiple Access system of claim 13, wherein said step of calculating a sum of said M modified Bessel functions of the first kind calculates a sum of a predetermined bit using a calculated sum of other bit.

15. A soft information data processor used for a Code Division Multiple Access System comprising:
means for calculating a modified Bessel function of the first kind;
means, operatively coupled to said means for calculating a modified Bessel function of the first kind, responsive to calculate pairs of bit metrics for use in a Viterbi decoder;
wherein said Code Division Multiple Access system employs M-ary orthogonal signaling and noncoherent detection;
wherein set of decision variables X1 to XM, computed in an optimum demodulator, are used as input data to said soft information processor.

16. The soft information data processor of claim 15, wherein said means for calculating a modified Bessel function of the first kind, comprising:
a ROM look-up table containing a zero order modified Bessel function of the first kind for single path receiver case;
a ROM look-up table containing an L−1 order modified Bessel function of the first kind for the L paths diversity combining case;
wherein said ROM look-up table addressing is based on quantized value of said decision variable X1 to XM; and
wherein said means for calculating modified Bessel function generates set of values Y1 to YM for each set of said decision variables X1 to XM.

17. The soft information data processor of claim 15, wherein said means responsive to calculate a pairs of bit metrics, comprising:
means for calculating two bit metrics MBi(x/0) and MBi(x/1) for each coded bit Bi, wherein i=1, . . . , K=$\log_2 M$;

wherein the bit metric MBi(x/0) is the transition metric used in Viterbi decoder when bit Bi=0 is transmitted and set of decision variables X1 to XM received;

wherein the bit metric MBi(x/1) is the transition metric used in Viterbi decoder when bit Bi=1 is transmitted and set of decision variables X1 to XM received;

wherein said bit metrics calculator used said Bessel function calculator outputs, said Y1 to YM, to calculate bit metrics MBi(x/0) and MBi(x/1);

means for sharing the computation between the bits.

18. The soft information data processor of claim 17, wherein said means for calculating two bit metrics for each coded bit Bi, further comprising:

means, operatively coupled to said Bessel function calculator, responsive to calculate sum and logarithm for said bit metric MBi(x/0); and means, operatively coupled to said Bessel function calculator, responsive to calculate sum and logarithm for said bit metric MBi(x/1).

19. The soft information data processor of claim 18, wherein said means responsive to calculate sum and logarithm for bit metric MBi(x/0), further responsive to calculate a sum 0 by, summing all values Y1 to YM of each set of said decision variable X1 to XM, for which the bit Bi has value 0, so only those coefficients from said Bessel function calculator for which the bit Bi=0, contribute to this sum, the said bit metric MBi(x/0) is calculated by taking logarithm of said sum 0.

20. The soft information data processor of claim 18, wherein said means responsive to calculate sum and logarithm for bit metric MBi(x/1), further responsive to calculate a sum 1 by, summing all values Y1 to YM of each set of said decision variable X1 to XM, for which the bit Bi has value 1, so only those coefficients from said Bessel function calculator for which the bit Bi=1, contribute to this sum, the said bit metric MBi(x/0) is calculated by taking logarithm of said sum 1.

* * * * *